United States Patent [19]

Kawada et al.

[11] 4,361,794
[45] Nov. 30, 1982

[54] INDUCTION MOTOR DRIVE APPARATUS

[75] Inventors: Shigeki Kawada, Hino; Hiroshi Ishida, Hamuramachi, both of Japan

[73] Assignee: Fujitsu Fanuc Limited, Tokyo, Japan

[21] Appl. No.: 211,846

[22] Filed: Dec. 1, 1980

[30] Foreign Application Priority Data

Dec. 11, 1979 [JP] Japan .................................. 54/160500

[51] Int. Cl.³ .............................................. H02P 5/40
[52] U.S. Cl. ..................................... 318/800; 318/811
[58] Field of Search ............... 318/800, 801, 802, 803, 318/807, 810, 811

[56] References Cited

U.S. PATENT DOCUMENTS 4,028,600 6/1977 Blaschke ............................. 318/803

Primary Examiner—David Smith, Jr.
Attorney, Agent, or Firm—Staas & Halsey

[57] ABSTRACT

An induction motor drive apparatus of the type having a speed detector for detecting the rotational speed of an induction motor, speed command device for producing a command speed, and an error amplifier for amplifying a difference between the rotational speed of the induction motor and the command speed, the induction motor being driven by so controlling the amplitude of the primary current as to vary the amplitude of the secondary current in accordance with the difference between the rotational and command speeds. Included are two-phase sinusoidal wave generating device for generating two sinusoidal signals displaced in phase from one another by $\pi/2$ and whose amplitudes conform to the output of the error amplifier, primary load current arithmetic device for computing a primary load current by employing the output of the error amplifier and the output of the two-phase sinusoidal wave generating means, and primary current arithmetic means for computing a two-phase primary current command by adding the primary load current to the output of the two-phase sinusoidal wave generating device, which output serves as an excitation current. The induction motor is driven by the primary current command having an excitation current component and a primary load current component the amplitudes of which vary in accordance with the difference between the rotational speed of the induction motor and the command speed.

11 Claims, 8 Drawing Figures

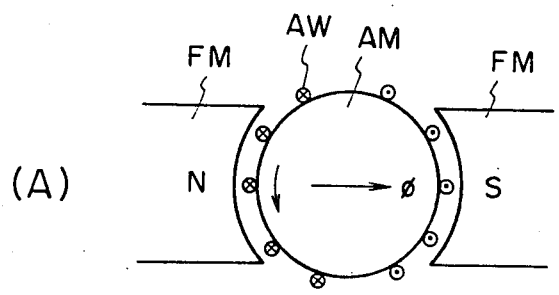
Fig. 1
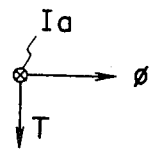
Fig. 4
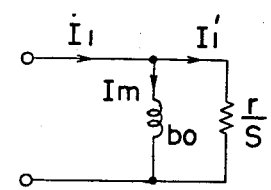
Fig. 2
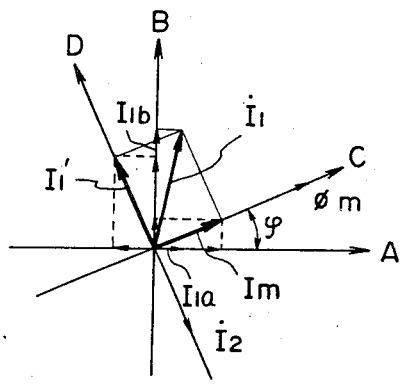
Fig. 3
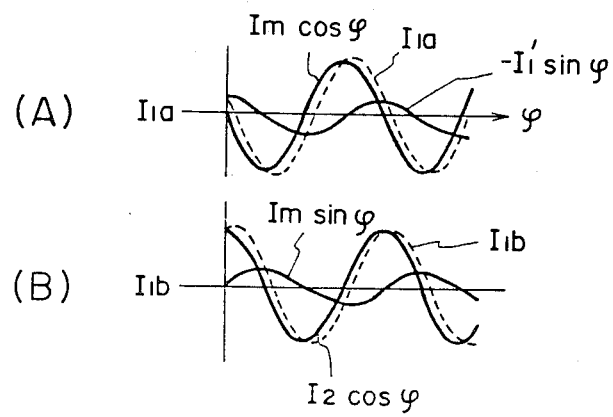

INDUCTION MOTOR DRIVE APPARATUS

BACKGROUND OF THE INVENTION

This invention relates to an induction motor drive apparatus, and more particularly to an induction motor drive apparatus which is capable of reducing noise during operation under a light load.

It is well known in the art that variable frequency (VF) control or variable voltage-variable frequency (VVVF) control can be applied to drive and control induction motors by converting a direct current into alternating current through an inverter circuit and then utilizing the alternating current to operate the motor. With variable frequency VF control the primary frequency of the inverter circuit, namely the output of the inverter circuit, is varied in accordance with a command speed. With variable voltage-variable frequency VVVF control, on the other hand, the amplitude of the primary voltage is also varied in proportion to the change in the primary frequency, so that the output torque is held constant.

In accordance with these conventional control systems the speed of an induction motor is controlled by adjusting the amplitude and frequency of the primary voltage. However, since such systems achieve control on the basis of mean values, it has not been possible to achieve instantaneous control with a high degree of response. Pulse width control systems have recently been employed in an effort to improve upon the systems described. This has led to the development and application of a so-called "vector control system" which utilizes pulse width control to control an instantaneous value of an induction motor stator current so as to enable the generation of a torque which is truly equivalent to that produced by a shunt DC machine. See, for example, "Induction Motor Vector Control" in the magazine *Yasukawa Denki*, No. 4, 1974, pages 597 through 599 (published by Yasukawa Denki). However, even these new systems employ a pulse control method which is similar to the conventional slip control method, with the result that a considerable level of excitation noise is generated during induction motor operation. When the induction motor is operating under a heavy load the excitation noise is not particularly noticeable since it is drowned out by the cutting noise produced by a machine tool or the like. The excitation noise can, however, become quite annoying to personnel in the immediate vicinity if the induction motor is idling or running under a light load.

SUMMARY OF THE INVENTION

Accordingly, it is an object of the present invention to provide an induction motor drive apparatus which employs a vector control system to permit a reduction in noise such as excitation noise when the induction motor is operating under a light load.

It is another object of the present invention to provide an induction motor drive apparatus which employs a vector control system that permits excitation current to be regulated in accordance with load so that excitation noise can be reduced.

It is a further object of the present invention to provide an induction motor drive apparatus which employs a vector control system having a novel structure.

Other features and advantages of the invention will be apparent from the following description taken in conjunction with the accompanying drawings.

BRIEF DESCRIPTION OF THE DRAWINGS

FIGS. 1 through 3 are illustrative views which are useful in describing the vector control of an induction motor, FIG. 1A showing the torque generating mechanism of a DC machine, FIG. 1B showing the relationship of current, mainflux and torque, FIG. 2 showing a vector diagram associated with a two-phase induction motor, and FIG. 3 showing the phase relationship between an excitation current component and a primary load current component;

FIG. 4 is an equivalent circuit diagram of an induction motor;

DESCRIPTION OF THE PREFERRED EMBODIMENT

Figure 5:
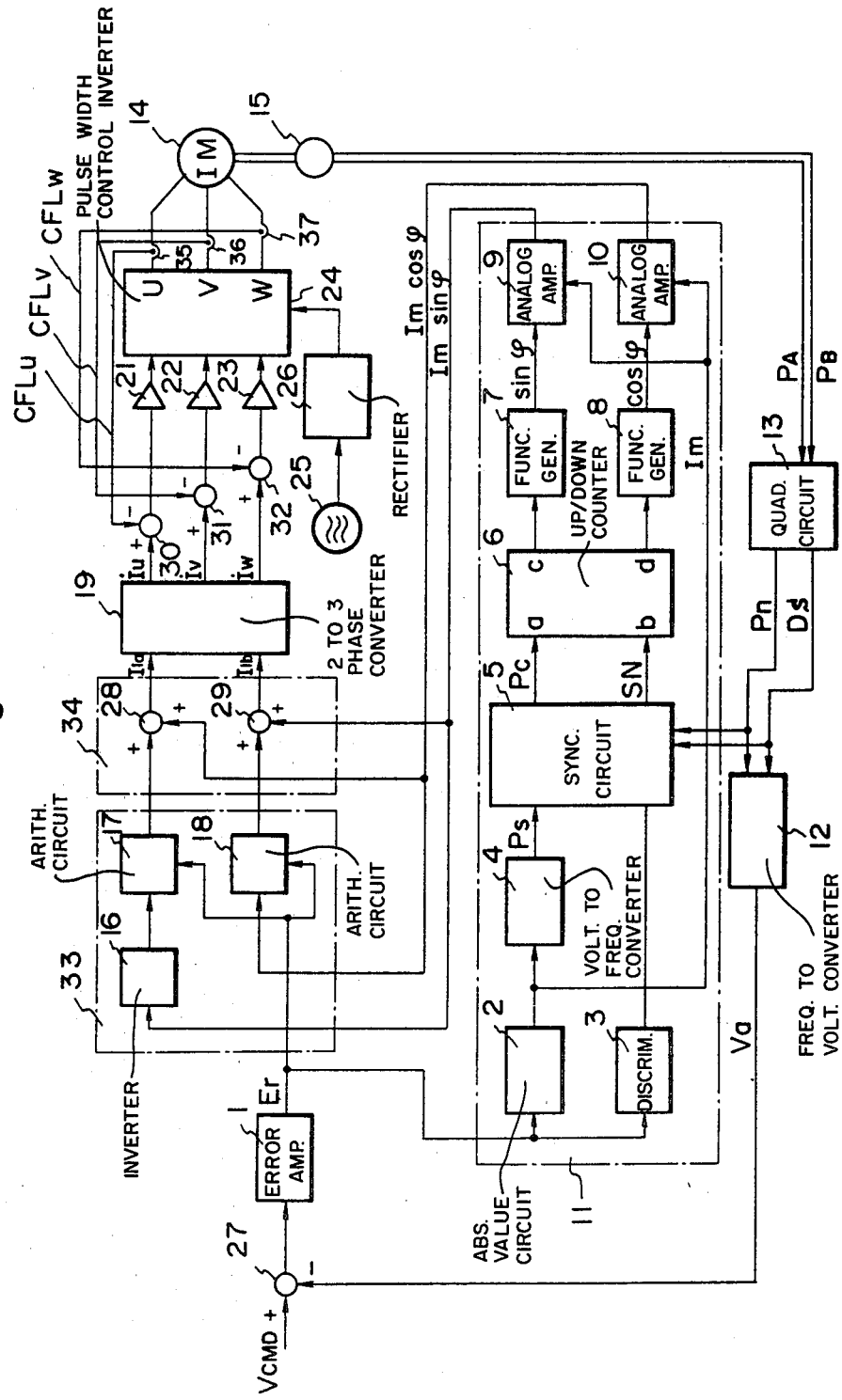
FIG. 5 is a circuit block diagram embodying the present invention.

An induction motor vector control system is based on the principle of torque generation in a shunt DC machine and generates a torque equivalent to that of the shunt DC machine by controlling the instantaneous value of the stator current. In general, the torque generating mechanism of a shunt DC machine employs a commutator to effect a current switching operation in such a manner that armature current $I_a$ is perpendicular to the main flux $\Phi$ at all times, as illustrated in FIGS. 1A and 1B. The generated torque T, given by the following equation, will be proportional to the armature current $I_a$ if the main flux $\Phi$ is constant. Thus, $$T = kI_a\Phi \tag{1}$$

In FIG. 1A, FM denotes a field magnet, AM an armature, and AW the armature winding.

If the above relation is applied to an induction motor, then $\Phi$ can be made to correspond to the flux vector $\dot{\Phi}_2$ of the rotor, and $I_a$ can be made to correspond to the secondary current vector $\dot{I}_2$. Accordingly, to drive the induction motor in a manner equivalent to the generation of torque in a shunt DC machine, the rotor flux vector $\dot{\Phi}_2$ and the secondary current vector $\dot{I}_2$ should be so controlled as to constantly maintain the relationship shown in FIG. 1B, that is, so as to maintain the perpendicular relationship between them.

Thus, vector control assures a perpendicular relationship between the flux vector $\dot{\Phi}_2$ and the current vector $\dot{I}_2$. The generated torque T, neglecting secondary leakage inductance, is given by $$T = k\dot{I}_2 \times \dot{\Phi}_2 = kI_2\Phi_2 = kI_2\Phi_m \tag{2}$$

where $\Phi_m$ is the main flux arising from the excitation current $I_m$.

Reference will now be had to the vector diagram of FIG. 2 to describe a method of driving a two-phase induction motor in accordance with vector control. The C-D axes represent a coordinate system which coincides with the phase of the main flux $\Phi_m$, and the A-B axes represent a static coordinate system corresponding to the stator of the induction motor. $\dot{I}_1$ denotes stator current (primary current), $I_m$ the excitation current component, and $I_1'$ a primary load current component. $\dot{I}_{1a}$ and $\dot{I}_{1b}$ denote the components of the stator current $I_1$ along the A and B axes, respectively, that is, the A-phase stator current and the B-phase stator current. If it is assumed that the main flux $\Phi_m$ is rotating with respect to the static coordinate system of the stator and that the angle of rotation is $\phi$, (where, with $\omega$ denoting the angular velocity, $\phi = \omega t$), then the A-phase stator current $I_{1a}$ and B-phase stator current $I_{1b}$ will be represented by the respective equations $$I_{1a} = I_m \cos \phi - I_1' \sin \phi \tag{3}$$

$$I_{1b} = I_m \sin \phi + I_1' \cos \phi \tag{4}$$

$I_{1a}$ and $I_{1b}$ are shown in FIGS. 3 A and B, respectively.

The primary load current $I_1'$ and secondary current $I2$ differ in phase by 180° and are related by the equation $$I_2 = kI_1' \tag{5}$$

Here, k is dependent upon the turn ratio and phase ratio between the primary and secondary sides.

In accordance with vector control, the A-phase and B-phase stator currents $I_{1a}$, $I_{1b}$, given by equations (3) and (4), are generated and applied to the stator winding, namely the primary winding, thereby driving the induction motor. With this conventional vector control system, only the primary load current $I1'$ (secondary current) is increased or decreased in accordance with an increase or decrease in load, and the excitation current $I_m$ is held constant.

Illustrated in FIG. 4 is the equivalent circuit of an induction motor which will now be referred to in order to describe the reason for varying solely the primary load current $I_1'$ in relation to the change in load. In FIG. 4, $b_o$ represents the exciting susceptance, r the equivalent resistance, and s the slip. When the load of the induction motor attains a large value, the slip s also increases in size so that the quantity r/s decreases. The primary load current $I_1'$ (secondary current $I_2$) increases in accordance with the load, but the excitation current $I_m$ is constant. In accordance with the conventional vector control system, therefore, only the primary load current $I_1'$ is varied despite an increase or decrease in load. Accordingly, with the conventional apparatus which is adapted to drive an induction motor by means of a vector control system in the foregoing manner, the excitation current $I_m$ has the same magnitude regardless of whether the motor is operating under a heavy load or a light load. The result is the generation of excessive excitation noise as mentioned above.

When operating an induction motor through use of a pulse width control system inverter, the level of noise generated by the induction motor is proportional to the primary excitation current of the motor. Accordingly, when operating an induction motor in accordance with a vector control system, the principle of the present invention resides in decreasing the primary excitation current of the induction motor when the load is light, and increasing the primary excitation current as the load becomes heavier.

This may be achieved through the embodiment of the present invention shown in the block diagram of FIG. 5. The apparatus in FIG. 5 includes a proportional integrating-type error amplifier 1, an absolute value circuit 2 for taking the absolute value of the output delivered by the error amplifier 1, a direction discrimination circuit 3, and a voltage-frequency converter (referred to as a V-F converter hereinafter) 4 which is adapted to produce pulses $P_s$ of a frequency (equivalent to four times the slip frequency) proportional to the level of the analog signal output of the absolute value circuit 2. A synthesizing circuit 5 combines the pulses $P_s$ from the voltage frequency converter VF 4 and pulses $P_n$ of a frequency proportional to the rotational speed of an induction motor 14, thereby to produce a combined pulse train $P_c$. The circuit 5 also produces a sign signal SN for each of the pulses. The pulses $P_c$ and sign signal SN are applied to an up/down counter 6 which up-counts or down-counts the pulses $P_c$ in accordance with the sign signal SN. The value of the count in the up/down counter 6 is applied to function generators 7, 8 which produce a sine wave voltage $\sin \phi$ and a cosine wave voltage $\cos \phi$, respectively, in accordance with the value of the count. Multipliers 9, 10 vary the amplitudes of the respective sine and cosine voltages in accordance with the output voltage of the error amplifier 1, that is, in accordance with the load. The blocks of circuitry 2 through 10 constitute a two-phase sine wave generator circuit 11. A quadrupling circuit 13 receives rotation signals $P_A$, $P_B$, which differ in phase by 90°, from a pulse generator 15 which is coupled to the rotary shaft of the induction motor 14, and is adapted to convert these signals into the pulses $P_n$ having four times the frequency of the rotation signals, and to deliver a direction discrimination signal DS upon discriminating the phase of the rotation signals $P_A$, $P_B$. A frequency-voltage converter (referred to as an F-V converter hereinafter) 12 receives the signals $P_n$ and DS from the quadrupling circuit 13 and converts the former into an analog signal as will be described later.

An inverter circuit 16 and multiplier circuits 17, 18, constitute a primary load current arithmetic circuit 33. Designated at 19 is a two-phase to three-phase converter circuit which is shown in greater detail in FIG. 6.

Figure 6:
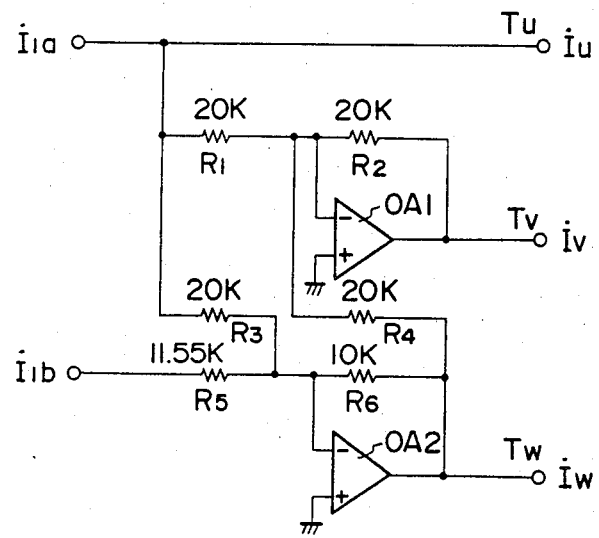
FIG. 6 is a circuit diagram of a two-phase to three-phase converter.

In FIG. 6, the two-phase to three-phase converter circuit 19 is shown to include two operational amplifiers OA1, OA2, resistors $R_1$ through $R_4$ each having a value of 20 kΩ, a 11.55 kΩ-resistor $R_5$, and a 10 kΩ-resistor $R_6$. With the stated values of the resistors $R_1$ through $R_6$ and the connections as shown, the following outputs are obtained from the respective terminals Tu, Tu and Tw:

$$i_U = i_{1a}, \tag{6}$$

$$i_V = \tfrac{1}{2} i_{1a} + \frac{\sqrt{3}}{2} i_{1b}, \tag{7}$$

and $$i_W = \frac{-1}{2} i_{1a} - \frac{\sqrt{3}}{2} i_{1b}. \tag{8}$$

Here, $\dot{I}_U$, $\dot{I}_V$ and $\dot{I}_W$ are currents which are displaced in phase from each other by $2\pi/3$.

The apparatus of FIG. 5 further includes amplifier circuits 21 through 23, a pulse width control-type inverter 24, a three-phase AC power supply 25, and a rectifier circuit 26 for rectifying the three-phase alternating current from the AC power supply 25 into direct current.

Figure 7:
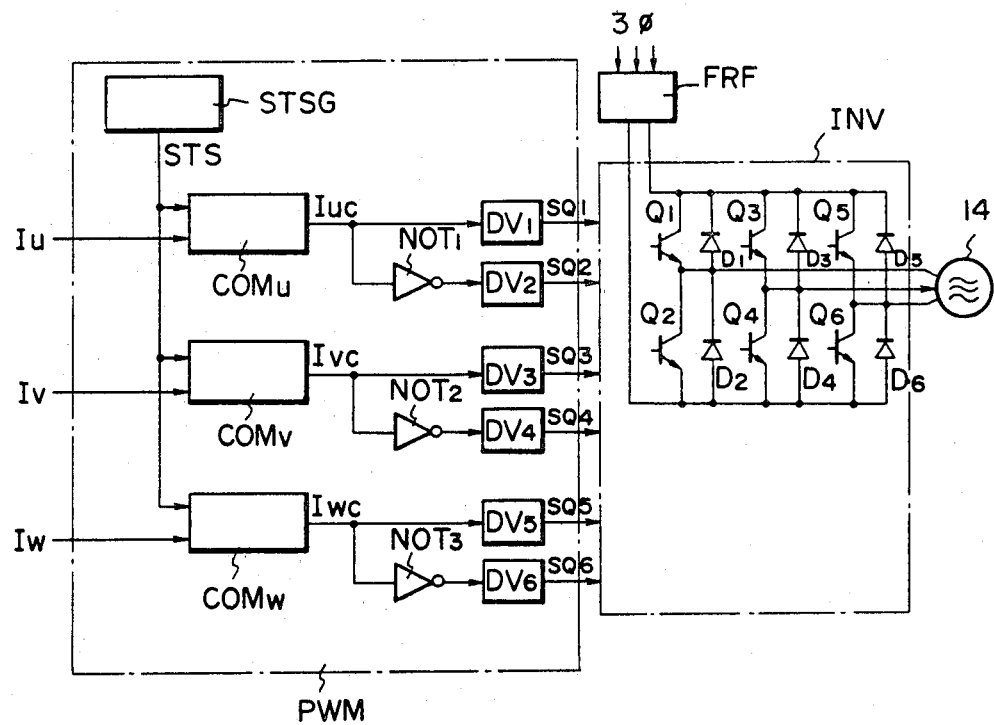
FIG. 7 is a diagram showing the structure of a pulse width modulator circuit and an inverter.
Figure 8:
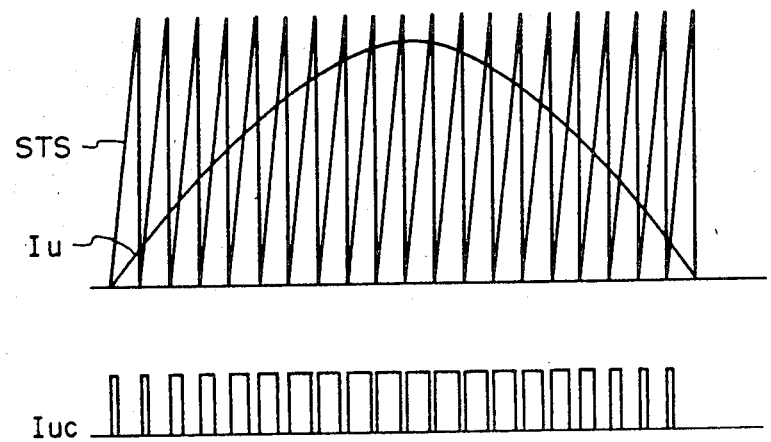
FIG. 8 is a waveform diagram for describing the pulse width modulation effected by the circuitry of FIG. 7.

The pulse width control-type inverter circuit 24, illustrated in detail in FIG. 7, includes a pulse width modulator circuit PWM and an inverter INV. The pulse width modulator circuit PWM in turn comprises a sawtooth signal generating circuit STSG for generating a sawtooth signal STS, comparators $COM_U$, $COM_V$, NOT gates $NOT_1$ through $NOT_3$, and drivers $DV_1$ through $DV_6$. The inverter INV comprises six power transistors $Q_1$ through $Q_6$, and six diodes $D_1$ through $D_6$. The comparators $COM_U$, $COM_V$, $COM_W$ compare the sawtooth signal STS with the amplitudes of the alternating signals $I_U$, $I_V$, $I_W$, respectively, and are adapted to deliver an output signal at logical "1" when the corresponding AC input is greater than the value of STS, or at logical "0" when the corresponding AC input is less than the value of STS. Thus, with respect to the signal $I_U$, the comparator $COM_U$ issues the pulse width modulated current command $I_{UC}$ illustrated in FIG. 8. Comparators $COM_V$ and $COM_W$ operate in a similar manner to produce the pulse modulated current commands $I_{VC}$ and $I_{WC}$, respectively. More specifically, the current commands $I_{UC}$, $I_{VC}$ and $I_{WC}$ of three phases are pulse width modulated in accordance with the amplitudes of the signals $I_U$, $I_V$ and $I_W$, respectively. The NOT gates $NOT_1$ through $NOT_3$ and drivers $DV_1$ through $DV_6$ cooperate to convert these current commands into drive signals $SQ_1$ through $SQ_6$ which control the switching action of the power transistors $Q_1$ through $Q_6$ forming the inverter INV.

Returning again to FIG. 5, addition/subtraction circuits are designated at reference numerals 27 through 32, current feedback loops at CFLU, CFLV and CFLW, and current transformers at 35 through 37 for detection of the U, V and W-phase primary currents, respectively. The addition/substraction circuits 28, 29 form a primary current arithmetic circuit 34, and the multipliers 17, 18 and inverter circuit 16 form the primary load current arithmetic circuit 33, as already mentioned above.

In operation, a speed command circuit which is not shown in the drawings applies a speed command signal $V_{CMD}$ of a prescribed analog value to the input terminal of the addition/subtraction circuit 27 to rotate the induction motor 14 at the desired speed. It will be assumed that the motor is running under a prescribed load in such a manner that the rotational speed of the motor is lower than the command speed by the amount of the slip S. The rotational speed of the induction motor 14 is detected by the pulse generator 15 serving as the speed detector, the pulse generator 15 producing the two pulse trains (rotation signals) $P_A$, $P_B$ which differ in phase by $\pi/2$ but whose frequencies are proportional to the rotational speed of the motor. The pulse trains $P_A$, $P_B$ are both applied to the quadrupling circuit 13 which converts them into the pulse train $P_n$ having four times the frequency of these input signals. The pulse train $P_n$ is converted into an analog speed signal $V_a$ by the F-V converter 12, which signal is coupled to the addition/subtraction circuit 27. The difference between the speed command signal $V_{CMD}$ and speed signal $V_a$ as obtained at the addition/subtraction circuit 27 is amplified into an error voltage Er by the error amplifier 1, and is then applied to the absolute value circuit 2 and direction discrimination circuit 3. More specifically, the error amplifier 1 performs a proportional integration operation in accordance with the following equations:

$$E_r = K_1(V_{CMD} - V_a) + K_2 \Sigma(V_{CMD} - V_a) \tag{9}$$

$$\Sigma(V_{CMD} = V_a) = \Sigma(V_{CMD} - V_a) + (V_{CMD} - V_a) \tag{10}$$

The absolute value circuit 2 takes the absolute value of the output obtained from the error amplifier 1, and the direction discrimination circuit 3 discriminates the sign of the output voltage, the discrimination circuit 3 delivering a signal at logical "1" if the sign is positive, and at logical "0" if the sign is negative. The output of the absolute value circuit 2 is indicative of the slip S, namely the state of the load seen by the induction motor 14, the signal voltage increasing or decreasing in accordance with an increase or decrease in load, respectively. The voltage-frequency V-F converter 4 produces the pulses Ps having a frequency which is proportional to the output voltage of the absolute value circuit 2. It should be noted that the frequency of the pulses Ps is four times the slip frequency. The synthesizing circuit 5 produces the signal $P_c$ by combining the output pulses Ps from the voltage-frequency V-F converter 4 and the pulses $P_n$ from the quadrupling circuit 13. The up/down counter 6 either counts up or counts down the output pulses $P_c$ from the synthesizing circuit in accordance with the corresponding sign signal SN. The value of the count in the counter 6 is then fed to the function generators 7, 8 which convert the count into the analog sine wave voltage sin $\phi$ and the analog cosine voltage cos $\phi$, respectively. If we let $\omega s$ denote the slip angular frequency and $\omega n$ the rotational angular frequency, then $\phi$ will be equivalent to $(\omega s + \omega n)t$. In other words, the sine wave voltage sin $\phi$ and the cosine wave voltage cos $\phi$ will have constant peak values, and only the frequency will vary.

The sine and cosine voltages sin $\phi$ and cos $\phi$ obtained from the function generators 7, 8 are the respective A-phase and B-phase components of the excitation current, as shown in FIG. 2, but they are of constant amplitude regardless of any increase or decrease in the load seen by the induction motor 14. In accordance with the present invention, the multipliers 9, 10 multiply respective ones of the output voltages from the function generators 7, 8 by the output $I_m$ (which increases or decreases according to an increase or decrease in the load applied to the induction motor 14) from the absolute value circuit 2, thereby to produce the sine wave signal $I_m \sin \phi$ and the cosine wave signal $I_m \cos \phi$, respectively, the peak value of these signals being varied in accordance with the increase or decrease in load. The primary load current arithmetic circuit 33 receives the signals $I_m \sin \phi$ and $I_m \cos \phi$ and, using the multipliers 17, 18, multiplies them by the output $E_r$ of the error amplifier 1 thereby to form the primary load current components $(-I_1' \cdot \sin \phi)$ and $(I_1' \cdot \cos \phi)$. The primary current arithmetic circuit 34 comprising the addition/subtraction circuits 28, 29 receives these two-phase primary load current components and adds respective ones of the excitation current components ($I_m \cdot \cos \phi$) and ($I_m \cdot \sin \phi$) thereto, thereby forming the A-phase stator current $\dot{I}_{1a}$ which is equal to $I_m \cdot \cos \phi - I_1' \sin \phi$, and the B-phase stator current $\dot{I}_{1b}$, which is equal to $I_m \cdot \sin \phi + I_1' \cdot \cos \phi$, the latter being delayed in phase by 90° with respect to the former. These two-phase stator currents $\dot{I}_{1a}$, $\dot{I}_{1b}$ are applied to the two-phase to three-phase converter circuit 19 which responds by generating AC signals $I_U$, $I_V$, $I_W$ of three different phases, these being applied to the comparators $COM_U$, $COM_V$ and $COM_W$, respectively, as shown in FIG. 7. Each of these comparators compares the amplitude of its corresponding AC input with the sawtooth signal STS and produces the three-phase pulse width modulated current commands $I_{UC}$, $I_{VC}$ and $I_{WC}$, respectively. These are converted into the inverter drive signals $SQ_1$ through $SQ_6$ by means of the NOT gates $NOT_1$ through $NOT_3$ and drivers $DV_1$ through $DV_6$, and the drive signals $SQ_1$ through $SQ_6$ are applied to the bases of respective ones of the power transistors $Q_1$ through $Q_6$ forming the inverter INV, whereby the conduction of the transistors is controlled to supply three-phase induction current to the three-phase induction motor 14. This operation continues until the rotational speed of the induction motor 14 is brought into conformance with the command speed.

The embodiment shown in FIG. 5 includes the detectors 35 through 37 for detecting the three-phase current flowing into the induction motor 14, and the current feedback loops CFLU, CFLV, CFLW connected from these detectors to the addition/subtraction circuits 30 through 32, thereby to effect the negative feedback of the detected current values.

It will be obvious from the foregoing description that the present invention enables the excitation current of an induction motor to be reduced in accordance with a decrease in the load of the motor in a vector control system of the type in which the running condition of the motor is made to conform to a variation in load. This assures that the induction motor will operate in an extremely quiet manner, even when it is running under a light load, since there is no excitation noise as is ordinarily generated when an induction motor is operated by the conventional vector control system.

Although the present invention has been described in its preferred form with a certain degree of particularity, it is obvious that many modifications and variations are possible in light of the above teachings. It is therefore to be understood that within the scope of the appended claims, the invention may be practiced otherwise than as specifically described.

What we claim is:

1. An induction motor drive apparatus of the type having a speed detector for detecting a rotational speed of an induction motor, speed command means for producing a command speed and an error amplifier for amplifying a difference between the rotational speed of the induction motor and the command speed, the induction motor being driven by controlling the amplitude of a primary current to vary the amplitude of a secondary current in accordance with the difference between the rotational and command speeds, said apparatus comprising:

two-phase sinusoidal wave generating means, operatively connected to the error amplifier, for generating two sinusoidal signals displaced in phase from one another by $\pi/2$ and whose amplitudes and frequencies conform to the output of the error amplifier;

primary load current arithmetic means, operatively connected to the error amplifier and to said two-phase sinusoidal wave generating means, for generating a primary load current by employing the output of the error amplifier and the output of said two-phase sinusoidal wave generating means;

primary current arithmetic means, operatively connected to said primary load current arithmetic means and to said two-phase sinusoidal wave generating means, for generating a two-phase primary current command by adding the primary load current to the output of said two-phase sinusoidal wave generating means, which output serves as an excitation current; and means, operatively connected to said primary current arithmetic means and to the induction motor, for driving the induction motor in dependence upon the two-phase primary current command, so that the primary current is amplitude controlled in dependence upon the load on the induction motor.

2. An induction motor drive apparatus according to claim 1, wherein the error amplifier receives the difference between the command speed and the rotational speed of the induction motor, amplifies said difference and performs a proportional integrating operation.

3. An induction motor drive apparatus according to claim 1, wherein said two-phase sinusoidal wave generating means is operatively connectable to receive first pulses having a frequency proportional to the rotational speed of the induction motor, wherein said two-phase sinusoidal wave generating means comprises:

a voltage-to-frequency converter, operatively connected to the error amplifier, for generating second pulses of a frequency which is proportional to the difference between the command speed and the rotational speed of the induction motor;

a counter circuit, operatively connected to said voltage-to-frequency converter and operatively connectable to receive the first pulses, for combining and counting the first pulses and second pulses;

function generators, operatively connected to said counter circuit, for generating two sinusoidal signals which differ in phase from one another by $\pi/2$ in dependence upon the value of the count in said counter circuit; and multiplier circuits, operatively connected to said function generators and to the error amplifier, for multiplying the outputs of said function generators by the output of the error amplifier and for generating the two sinusoidal signals displaced in phase from one another by $\pi/2$ and whose amplitudes are in proportion to the output of the error amplifier.

4. An induction motor drive apparatus according to claim 1, wherein the two sinusoidal signals are expressed by $I_m \sin \phi$ and $I_m \cos \phi$, wherein said primary load current arithmetic means comprises:

an inverter circuit, operatively connected to said two-phase sinusoidal wave generating means, for inverting the phase of the one of the two sinusoidal signals, expressed by $I_m \sin \phi$, output by the two-phase sinusoidal wave generating means, thereby generating a third sinusoidal signal expressed by $-I_m \sin \phi$;

a first multiplier circuit, operatively connected to the error amplifier and to said two-phase sinusoidal wave generating means, for multiplying the output of the error amplifier by the other of the two sinusoidal signals, expressed by $I_m \cos \phi$, output by the two-phase sinusoidal wave generating means, thereby generating a fourth sinusoidal signal expressed by $I_1' \cos \phi$; and a second multiplier circuit, operatively connected to said error amplifier and to said inverter circuit, for multiplying the output of the error amplifier by the output of said inverter circuit, thereby generating a fifth sinusoidal signal expressed by $-I_1' \sin \phi$.

5. An induction motor drive apparatus according to claim 4, wherein said primary current arithmetic means performs operations, expressed by $I_m \cos \phi - I_1' \sin \phi$, and $I_m \sin \phi - I_1' \cos \phi$, thereby generating a two-phase primary current command signal.

6. An induction motor drive apparatus according to claim 1, further comprising:
a two-phase to three-phase converter circuit, operatively connected to said primary current arithmetic means, for converting the two-phase primary current command into a three-phase signal; and
a pulse width modulator circuit, operatively connected to said two-phase to three-phase converter circuit and to the induction motor, for pulse-width modulating the three-phase signal output by the two-phase to three-phase converter circuit, the induction motor being driven by the output of said pulse width modulator circuit.

7. An induction motor drive apparatus according to claim 1, 2, 3, 4, 5 or 6, further including a three-phase rectifying power supply, wherein the three-phase signal received from said two-phase to three-phase converter circuit includes first through third phase signals, and wherein said pulse width modulator circuit comprises:
a sawtooth signal generator for generating a sawtooth signal;
first through third comparators, each operatively connected to the sawtooth signal generator and to said two-phase to three-phase converter, for comparing the first through third phase signals with the sawtooth signal and for generating corresponding first through third pulse width modulated current commands, respectively, each of the first through third pulse width modulated current commands has a pulse having a pulse width that is dependent on the first through third phase signals, respectively;
first through third NOT circuits, operatively connected to said first through third comparators, respectively, for generating first through third inverted pulse width modulated current commands in dependence upon the first through third pulse width modulated current commands, respectively;
first through sixth driver circuits, the first, third and fifth driver circuits operatively connected to said first through third comparators, respectively, and the second, fourth and sixth driver circuits operatively connected to said first through third NOT circuits, respectively, for receiving the first through third pulse width modulated current commands and the first through third inverted pulse width modulated current commands, respectively, and for generating first through sixth driver signals therefrom; and
an inverter, operatively connected to the three-phase rectifying power supply, to the induction motor and to the first through sixth driver circuits, for generating first through third inductor currents in dependence upon the first through sixth driver signals, thereby driving the induction motor.

8. An induction motor drive apparatus, operatively connectable to receive a speed command signal, comprising:
detection means, operatively connected to the induction motor and operatively connectable to receive the speed command signal, for detecting the rotational speed of the induction motor, for generating rotational pulses with a frequency proportional to the rotational speed of the induction motor and for generating an error signal which is the difference between the speed command signal and the rotational speed of the induction motor;
an error amplifier, operatively connected to said detection means, for generating an amplified error signal from the error signal;
two-phase sine wave generation means, operatively connected to said error amplifier and to said detection means, for generating an amplified sine signal and an amplified cosine signal having a phase difference therebetween and amplitudes and frequencies proportional to the amplified error signal and rotational pulses;
a primary load current arithmetic circuit, operatively connected to said error amplifier and to said two-phase sine wave generation means, for generating an inverted multiplied sine signal from the amplified sine signal and for generating a multiplied cosine signal from the amplified cosine signal;
a primary current arithmetic circuit, operatively connected to said primary load current arithmetic circuit and to said two-phase sine wave generation means, for adding the inverted multiplied sine signal to the amplified sine signal, for generating an A-phase stator current signal, for adding the multiplied cosine signal to the amplified cosine signal and for generating a B-phase stator current signal;
a two-phase to three-phase converter, operatively connected to said primary current arithmetic circuit, for generating first through third phase signals from the A-phase and B-phase stator current signals; and
a pulse width modulator, operatively connected to said two-phase to three-phase converter and to the induction motor, for generating first through third induction currents from the first through third phase signals and for driving the induction motor, so that the first through third induction currents are amplitude controlled in dependence upon the load upon the induction motor.

9. An induction motor drive apparatus according to claim 8, wherein said amplified error signal has positive and negative values, wherein said two-phase sine wave generation means comprises:
an absolute value circuit, operatively connected to said error amplifier, for generating an absolute value signal from the amplified error signal;
a direction discriminator, operatively connected to said error amplifier, for generating a first direction signal if the amplified error signal is positive and for generating a second direction signal if the amplified error signal is negative;
a voltage-to-frequency converter, operatively connected to said absolute value circuit, for generating slip pulses in dependence upon the absolute value signal;
a synthesizing circuit, operatively connected to said voltage-to-frequency converter, to said detection means and to said direction discriminator, for generating combined pulses in dependence upon the rotational pulses and the slip pulses and for generating a sign signal in dependence upon the first direction and second direction signals;
an up-down counter, operatively connected to said synthesizing circuit, for counting the combined pulses and for generating first and second count value signals in dependence upon the count, the direction of counting is controlled by the sign signal;

a first function generator, operatively connected to said up-down counter, for generating a sine signal from the first count value signal;

a second function generator, operatively connected to said up-down counter, for generating a cosine signal from the second count value signal;

a first analog amplifier, operatively connected to said first function generator, to said absolute value circuit and to said primary load current arithmetic circuit, for amplifying the sine signal in dependence upon the absolute value signal, thereby generating the amplified sine signal; and a second analog amplifier, operatively connected to said second function generator, to said absolute value circuit and to said primary load current arithmetic circuit, for amplifying the cosine signal in dependence upon the absolute value signal, thereby generating the amplified cosine signal.

10. An induction motor drive apparatus according to claim 8, wherein said primary load current arithmetic circuit comprises:

an inverter, operatively connected to said two-phase sine wave generation means, for inverting the amplified sine signal and generating an inverted amplified sine signal;

a first arithmetic circuit, operatively connected to said error amplifier, to said inverter and to said primary current arithmetic circuit, for multiplying the inverted amplified sine signal by the amplified error signal and generating the inverted multiplied sine signal; and a second arithmetic circuit, operatively connected to said two-phase sine wave generation means, to said error amplifier and to said primary current arithmetic circuit, for multiplying the amplified cosine signal by the amplified error signal and generating the multiplied cosine signal.

11. An induction motor drive apparatus according to claim 8, 9 or 10, wherein said primary current arithmetic circuit comprises:

a first adder, operatively connected to said primary load current arithmetic circuit, to said two-phase sine wave generation means and to said two-phase to three-phase converter, for adding the inverted multiplied sine signal to the amplified cosine signal and generating the A-phase stator current signal; and a second adder, operatively connected to said primary load current arithmetic circuit, to said two-phase sine wave generation means and to said two-phase to three-phase converter, for adding the multiplied cosine signal to the amplified sine signal and generating the B-phase stator current signal.

* * * * *

UNITED STATES PATENT AND TRADEMARK OFFICE
CERTIFICATE OF CORRECTION

PATENT NO. : 4,361,794
DATED : November 30, 1982
INVENTOR(S) : SHIGEKI KAWADA ET AL.

It is certified that error appears in the above-identified patent and that said Letters Patent is hereby corrected as shown below:

Front page, [57] ABSTRACT, line 18, "means" (second occurrence) should be --device--.

Column 3, line 8, "$I_{1a}$" should be --$\dot{I}_{1a}$--;

line 9, "$I_1$" should be --$\dot{I}_1$--;

line 24, "$I2$" should be --$\dot{I}_2$--;

line 26, "$I_2$" (in formula (5)) should be --$\dot{I}_2$--;

line 35, "$I1'$" should be --$I_1'$--.

Column 4, line 51, "Tu" (second occurrence) should be --Tv--.

Column 6, line 6, "=" (first occurrence in formula (10)) should be -----.

Signed and Sealed this

Seventeenth Day of May 1983

[SEAL]

Attest:

DONALD J. QUIGG

Attesting Officer

Acting Commissioner of Patents and Trademarks